(12) United States Patent
Sakakura

(10) Patent No.: US 12,546,839 B2
(45) Date of Patent: Feb. 10, 2026

(54) STATIC FIELD MAGNET AND MRI APPARATUS

(71) Applicant: CANON MEDICAL SYSTEMS CORPORATION, Otawara (JP)

(72) Inventor: Yoshitomo Sakakura, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 132 days.

(21) Appl. No.: 18/316,639

(22) Filed: May 12, 2023

(65) Prior Publication Data
US 2023/0375648 A1    Nov. 23, 2023

(30) Foreign Application Priority Data

May 17, 2022    (JP) .................................. 2022-081126

(51) Int. Cl.
G01R 33/38    (2006.01)
(52) U.S. Cl.
CPC ..................................... G01R 33/38 (2013.01)
(58) Field of Classification Search
CPC .. G01R 33/38; G01R 33/381; G01R 33/3806; G01R 33/48; G01R 33/383; A61B 5/0046; A61B 5/055; A61B 5/704
See application file for complete search history.

(56) References Cited

U.S. PATENT DOCUMENTS

| 7,167,004 | B1 | 1/2007 | Kruip |
| 7,394,255 | B2 | 7/2008 | McDougall et al. |
| 10,605,884 | B2* | 3/2020 | Ristic ............... G01R 33/56563 |
| 2004/0085170 | A1* | 5/2004 | Kruip ................. G01R 33/3806 |
| | | | 335/299 |
| 2011/0273177 | A1 | 11/2011 | Mcginley et al. |

FOREIGN PATENT DOCUMENTS

| JP | 2004-527282 A | 9/2004 |
| JP | 3808818 B2 | 8/2006 |

OTHER PUBLICATIONS

Extended European Search Report issued Oct. 9, 2023 in European Patent Application No. 23173747.9, 10 pages.
European Office Action dated Jun. 2, 2025, issued in European Patent Application No. 23173747.9.
Japanese Office Action dated Dec. 9, 2025, issued in Japanese Patent Application No. 2022-081126 (with English translation).

* cited by examiner

Primary Examiner — Daniel R Miller
(74) Attorney, Agent, or Firm — Oblon, McClelland, Maier & Neustadt, L.L.P.

(57) ABSTRACT

In one embodiment, a static field magnet to be used for MRI includes at least one loop coil pair including: a first loop coil to be supplied with an electric current in a first direction; and a second loop coil to be supplied with an electric current in a second direction opposite to the first direction, wherein: the first and second loop coils are arranged such that a first coil plane and a second coil plane are along a primary direction without overlapping each other, the primary direction being included in a primary plane, the first coil plane being a planar area surrounded by a first loop that forms the first loop coil, the second coil plane being a planar area surrounded by a second loop that forms the second loop coil; and the loop coil pair is configured to generate a static magnetic field parallel to the primary direction.

9 Claims, 14 Drawing Sheets

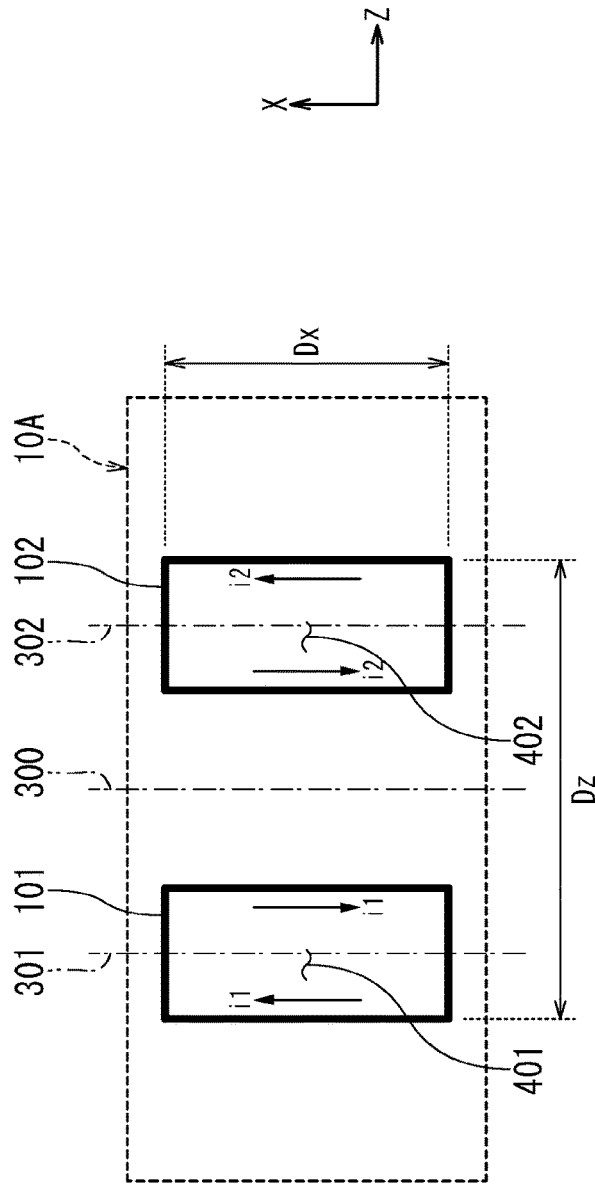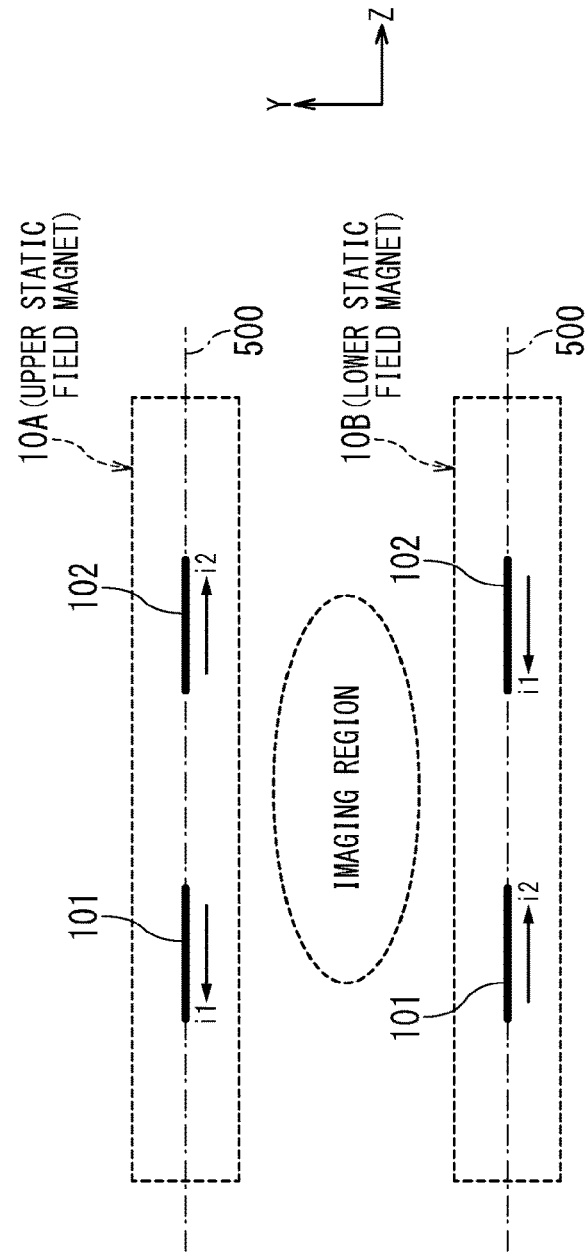
FIG. 4A
FIG. 4B

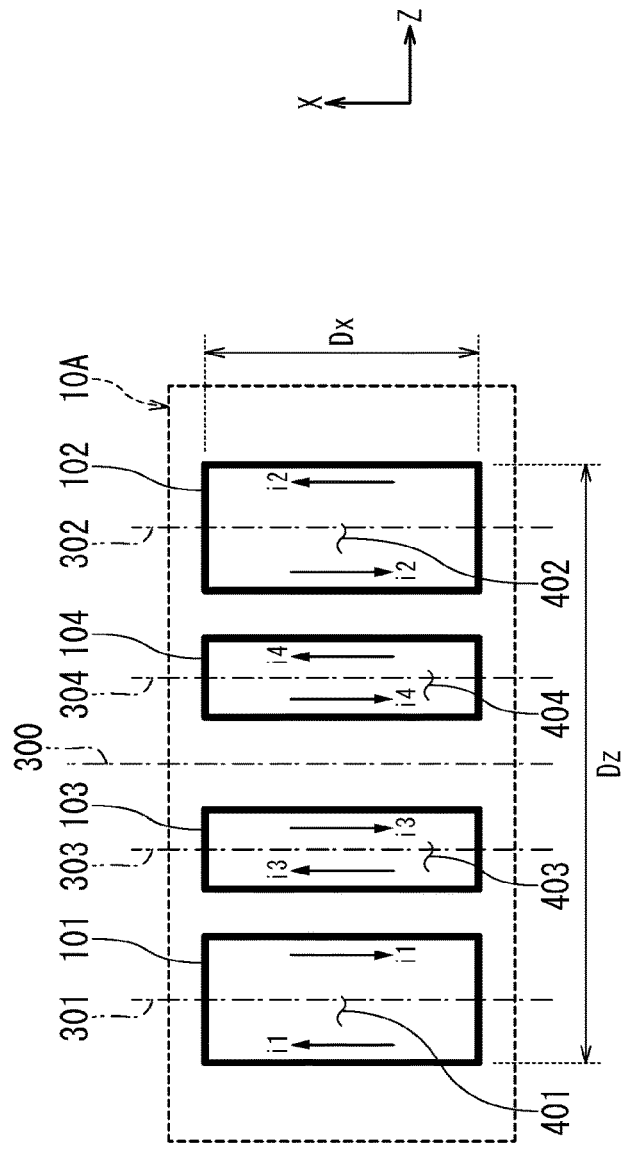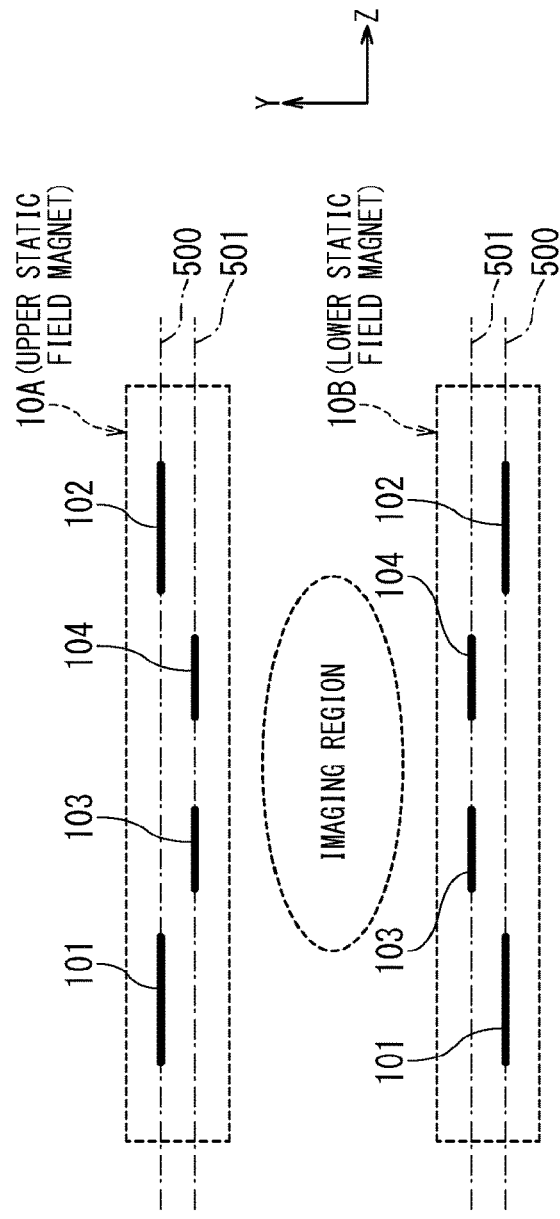
FIG. 7A
FIG. 7B

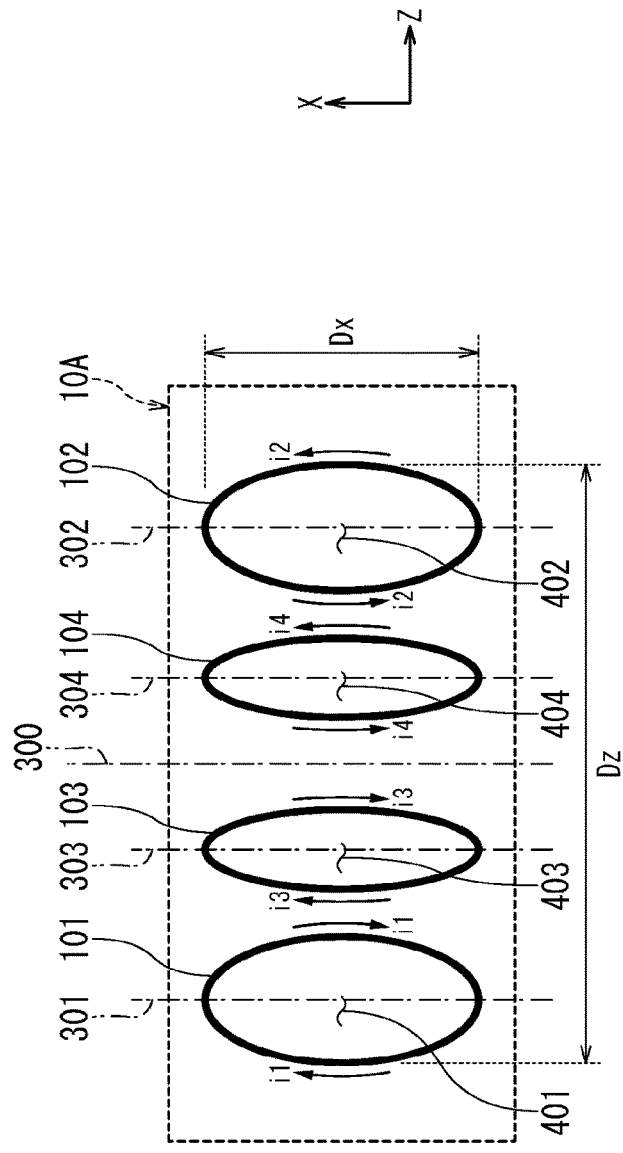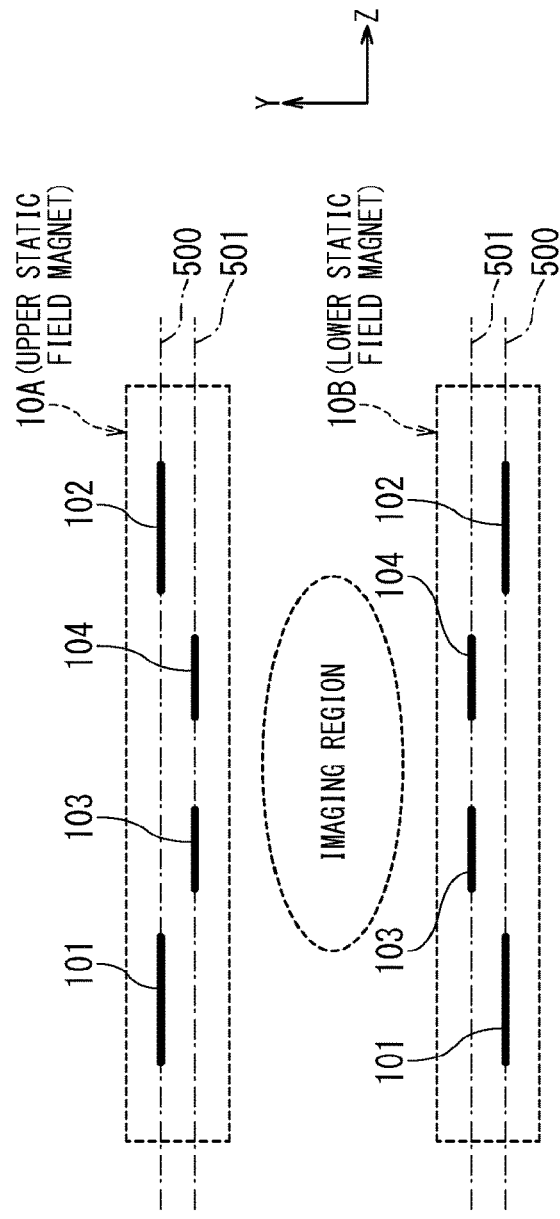
FIG. 9A
FIG. 9B

STATIC FIELD MAGNET AND MRI APPARATUS

CROSS-REFERENCE TO RELATED APPLICATION

This application claims the benefit of priority of Japanese Patent Application No. 2022-081126, filed on May 17, 2022, the entire contents of which are incorporated herein by reference.

FIELD

Disclosed Embodiments relate to a static field magnet and a magnetic resonance imaging (MRI) apparatus.

BACKGROUND

An MRI apparatus is an imaging apparatus that magnetically excites nuclear spin of an object placed in a static magnetic field with a radio frequency (RF) signal having the Larmor frequency and reconstructs an image based on magnetic resonance (MR) signals emitted from the object due to the excitation.

One type of MRI apparatuses has a configuration called a gantry which forms a cylindrical space called a bore. Imaging of an object such as a patient is performed in a state where a table with the object lying thereon is moved into the cylindrical space. Inside the gantry, a cylindrical static field magnet, a cylindrical gradient coil, and a cylindrical transmitting/receiving coil (i.e., WB (Whole Body) coil) are housed. This type of conventional MRI apparatuses, in which the static field magnet, the gradient coil, and the transmitting/receiving coil are cylindrical, is hereinafter referred to as a cylindrical MRI apparatus. The term static field magnet means a magnet for generating a static magnetic field.

In the cylindrical MRI apparatus, imaging is performed in the closed space in the bore, and thus, imaging may be difficult for some patients having claustrophobia, for example.

In another type of MRI apparatus having been developed, for example, two cylindrical static field magnets are arranged on the respective upper and lower sides with their central axes aligned in the vertical direction, and imaging of the object lying on the table is performed in the open space sandwiched by the two static field magnets from above and below. Hereinafter, an MRI apparatus of this type is referred to as an open MRI apparatus. In the open MRI apparatus, imaging is performed in the relatively open space, and thus, even a patient having claustrophobia can be imaged.

In a conventionally proposed open MRI apparatus, the coils (for example, superconducting coils) built into the respective upper and lower static field magnets are circular loop coils, and the upper circular loop coil and the lower circular loop coils are arranged coaxially with each other such that their coil planes are horizontal. Since the upper and lower loop coils are circular, the shape of the horizontal cross-section of the imaging region to be formed by the two static field magnets is circular.

Accordingly, in the case of trying to expand the imaging region of a recumbent object in the head-foot direction of the object, the diameter of each of the upper and lower circular loop coils has to be increased. Consequently, the diameter of each of the upper and lower static field magnets is also increased, which gives the object a sense of being confined in a closed space.

Further, increase in diameter of the upper and lower static field magnets makes it difficult to access the object at the time of performing a medical procedure such as percutaneous coronary intervention (PCI) on the object during imaging.

BRIEF DESCRIPTION OF THE DRAWINGS

In the accompanying drawings:

FIG. 4A is a plan view illustrating an internal configuration of an upper static field magnet;

FIG. 4B is a side view illustrating respective internal configurations of upper and lower static field magnets;

FIG. 7A and FIG. 7B are schematic diagrams illustrating a configuration of the static field magnet 10 according to the third modification;

FIG. 9A and FIG. 9B are schematic diagrams illustrating a configuration of the static field magnet 10 according to the fifth modification;

DETAILED DESCRIPTION

Hereinbelow, embodiments of the present invention will be described by referring to the accompanying drawings.

In one embodiment, a static field magnet configured to be used in an MRI apparatus configured to image an object,
the static field magnet comprising at least one loop coil pair that includes a first loop coil configured to be supplied with a first electric current in a first direction, and a second loop coil configured to be supplied with a second electric current in a second direction opposite to the first direction, wherein,
the first and second loop coils are arranged in such a manner that a first coil plane and a second coil plane are along a primary direction without overlapping each other, the primary direction being included in a primary plane, the first coil plane being a planar area surrounded by a first loop that forms the first loop coil, the second coil plane being a planar area surrounded by a second loop that forms the second loop coil, and the loop coil pair is configured to generate a static magnetic field parallel to the primary direction.

(Static Field Magnet)

Figure 1:
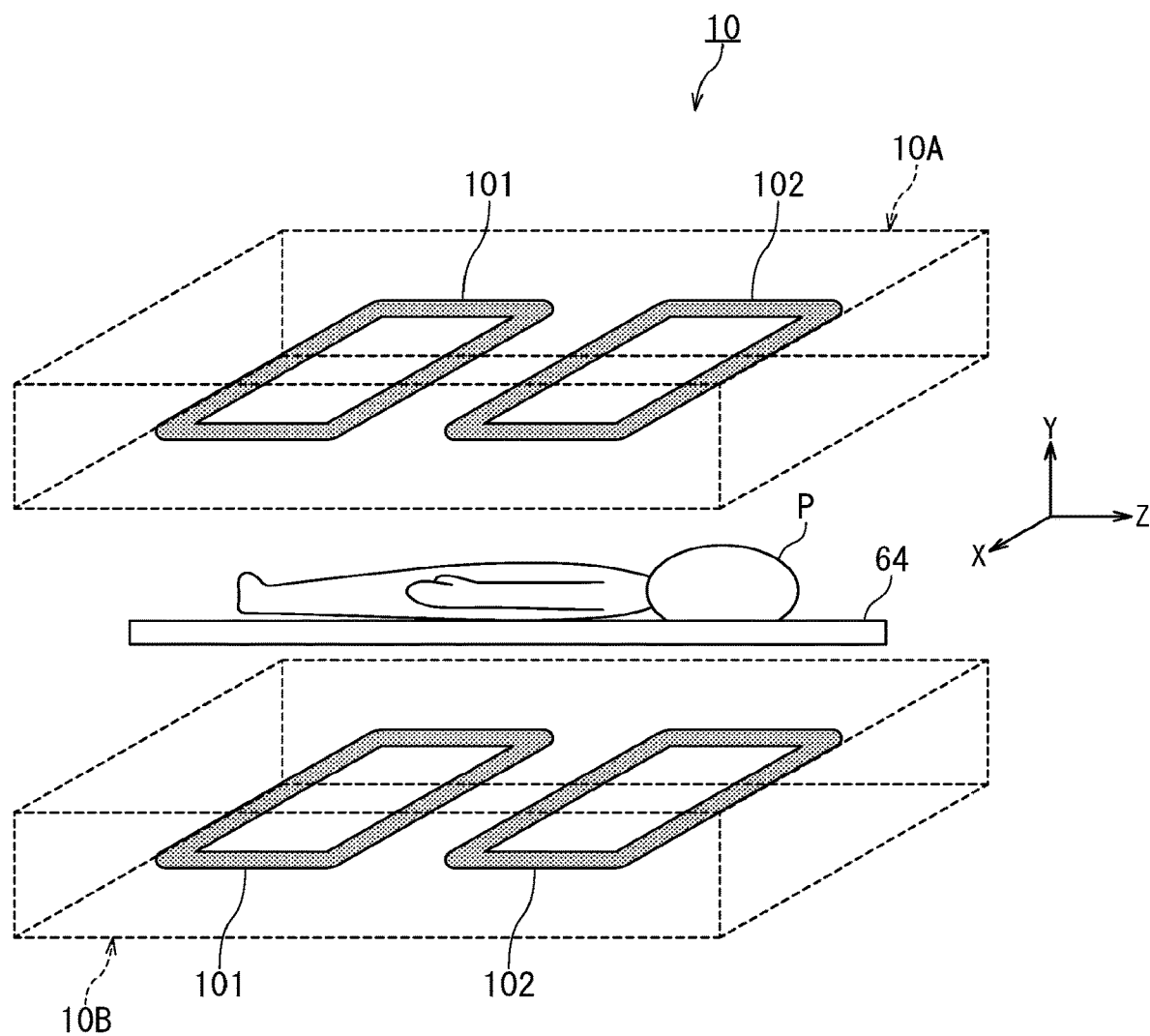
FIG. 1 is a schematic diagram illustrating a configuration concept of an open-type static field magnet to be used in an MRI apparatus according to the present embodiment.

FIG. 1 is a schematic diagram illustrating a configuration concept of an open-type static field magnet 10 used in an MRI apparatus 1 according to the present embodiment. As illustrated in FIG. 1, the static field magnet has, for example, two rectangular parallelepiped (or, rectangular cuboid) static field magnets 10A and 10B.

The imaging space of the MRI apparatus 1 is the space between the two static field magnets 10A and 10B. For example, when an object P lies on its back on a table 64, imaging of the object P can be performed in such a manner that the head-foot direction of the object P matches the longitudinal direction of the static field magnet 10 and the right-left direction of the object P matches the lateral direction of the static field magnet 10.

Each of the static field magnets 10A and 10B contains at least one loop coil pair composed of a first loop coil 101 and a second loop coil 102. Although FIG. 1 illustrates a configuration in which one loop coil pair 101, 102 is contained, as described below, the number of loop coil pairs may be two or more (in this case, the number of loop coils is four or more).

The static field magnet 10 may be configured as a superconducting magnet or as a normal conducting magnet (resistive magnet).

When the static field magnet 10 is configured as a superconducting magnet, each of the first and second loop coils 101 and 102 can be configured as an ultra-fine multifilamentary wire structure in which a superconducting material such as niobium titanium (Nb—Ti) is made into many thin filaments and embedded in a normal-conduction base material such as copper. Each of the first and second loop coils 101 and 102 is submerged in a liquid helium container (not shown) filled with liquid helium, for example.

Further, when the static field magnet 10 is configured as a superconducting magnet, a static magnetic field is generated by applying electric currents supplied from a magnet power supply (not shown) to the respective first and second loop coils 101 and 102 in an excitation mode, and afterward, the magnet power supply is disconnected when the static field magnet 10 shifts to a permanent current mode.

On the other hand, when the static field magnet 10 is configured as a normal-conducting magnet (resistive magnet), each of the first and second loop coils 101 and 102 is composed of a normal-conducting wire material such as copper, and generates a static magnetic field by using electric currents supplied from the magnet power supply (not shown).

Figure 2:
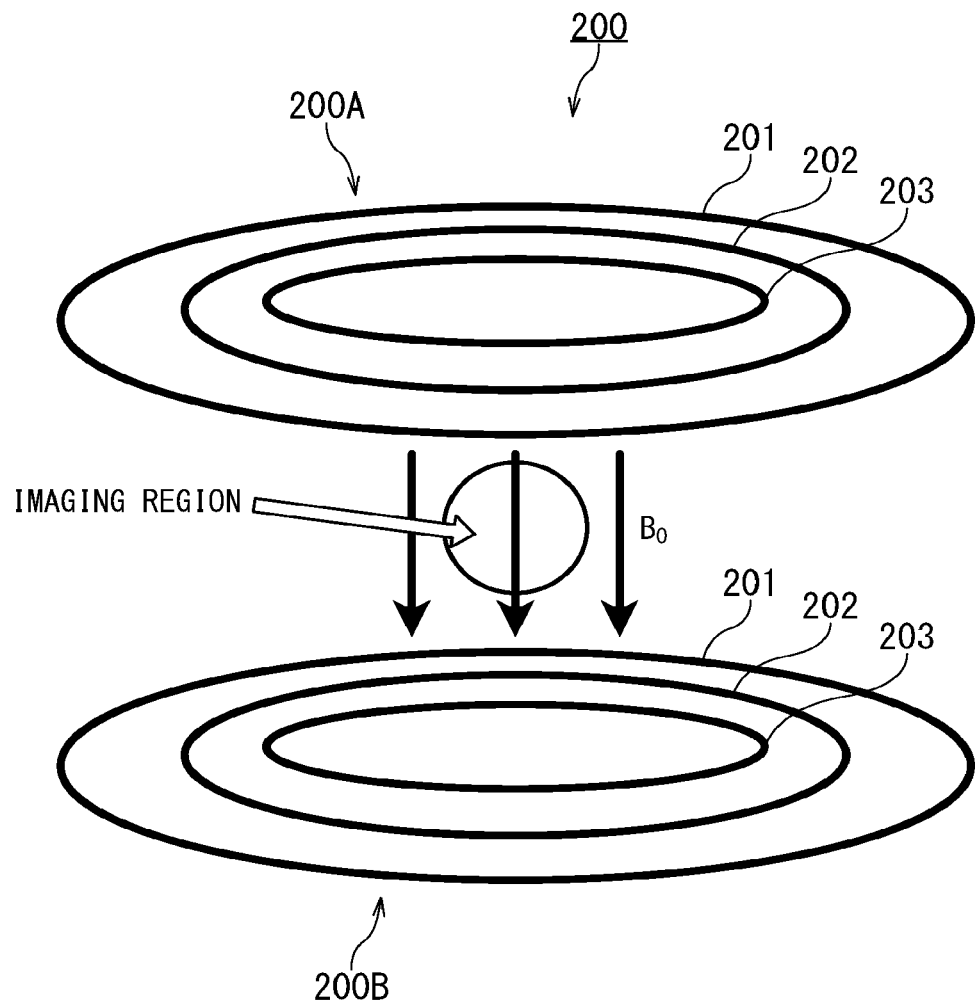
FIG. 2 is a schematic diagram illustrating a configuration of a conventional open-type static field magnet.

FIG. 2 is a schematic diagram illustrating a configuration of a conventional open-type static field magnet 200 as a comparative example with respect to the static field magnet 10 of the present embodiment. The conventional open-type static field magnet includes an upper static field magnet 200A and a lower static field magnet 200B. Each of the upper and lower static field magnets 200A and 200B is provided with one or more circular loop coils, for example, three circular loop coils 201, 202, 203. The upper circular loop coils 201, 202, 203 and the lower circular loop coils 201, 202, 203 are arranged coaxially with each other such that their coil planes are horizontal. The term "coil plane" means a planar area surrounded by a loop that forms a loop coil. The conventional open-type static field magnet 200 has such a configuration, and thus can generate a static magnetic field Bo in the direction orthogonal to each coil plane.

Since each of the upper and lower loop coils 201, 202, and 203 are circular, the shape of the horizontal cross-section of the imaging region formed by the two static field magnets 200A and 200B is also circular. For this reason, when expanding the imaging region of a recumbent object in the head-foot direction of the object, the diameter of each of the upper and lower circular loop coils 201, 202, 203 must be increased. As a result, the diameter of each of the upper and lower static field magnets 200A and 200B becomes large, which gives the object a sense of being confined in a closed space.

In addition, if the diameter of each of the upper and lower static field magnets 200A and 200B is increased, it becomes difficult to access the object from any direction at the time of performing a medical procedure such as percutaneous coronary intervention (PCI) on the object.

Figure 3:
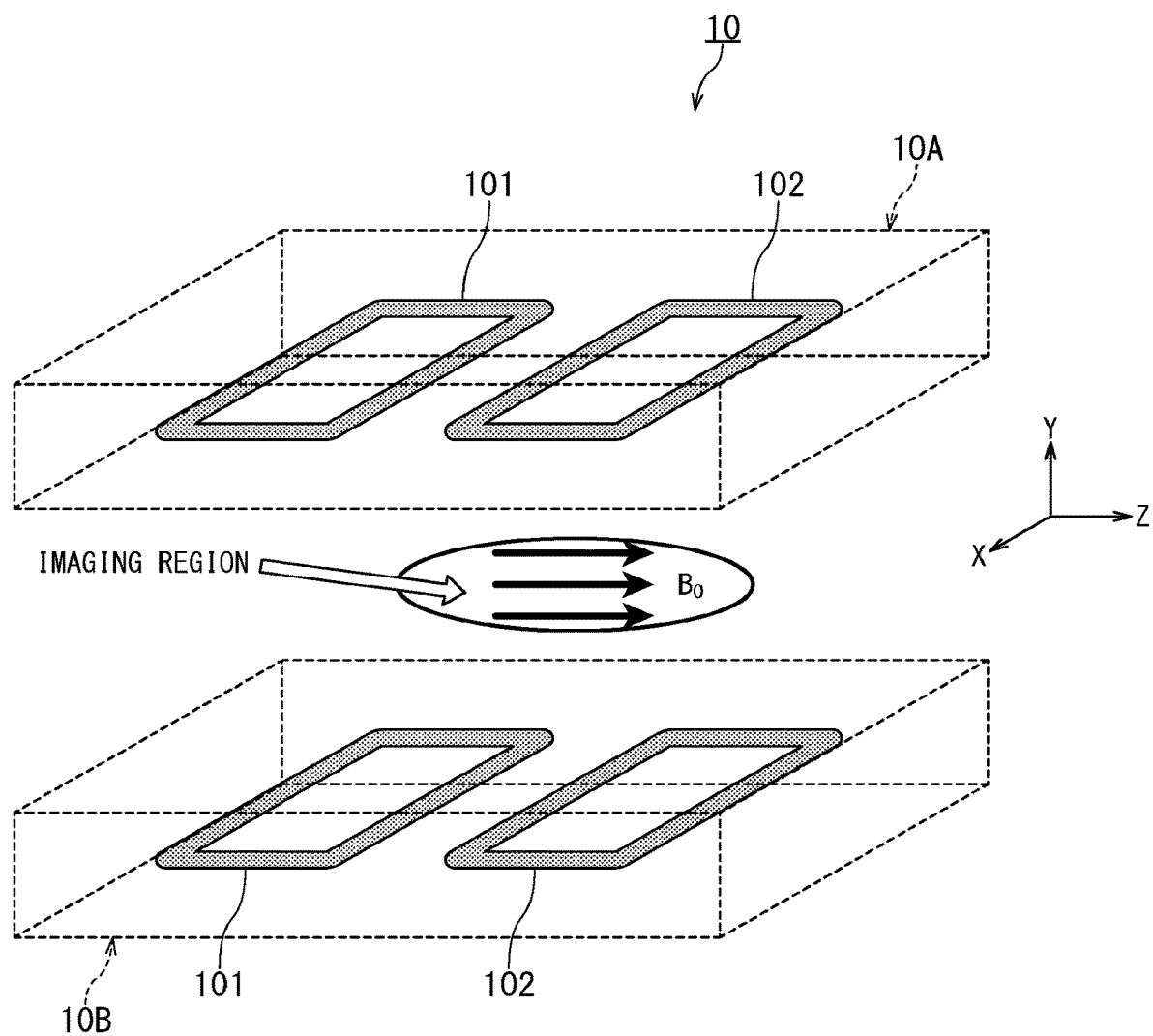
FIG. 3 is a schematic diagram illustrating a configuration of the static field magnet according to the present embodiment.

FIG. 3 is a schematic diagram illustrating a configuration of the static field magnet 10 according to the present embodiment. The static field magnet 10 of the present embodiment is configured of the upper and lower static field magnets 10A and 10B. As described above, each of the static field magnets 10A and 10B is, for example, a rectangular parallelepiped static field magnet, and the space between the two static field magnets 10A and 10B is the imaging region of the MRI apparatus 1.

Each of the static field magnets 10A and 10B contains a plurality of loop coils, for example, a loop coil pair composed of a first loop coil 101 and a second loop coil 102. These plurality of loop coils are arranged along the longitudinal direction of the rectangular parallelepiped static field magnets 10A and 10B such that the respective coil planes (i.e., planar area surrounded by the loop forming each loop coil) do not overlap each other, and this arrangement enables formation of an asymmetrically shaped imaging region that is wider in the longitudinal direction of the static field magnets 10A and 10B and narrower in the lateral direction of the static field magnets 10A and 10B.

In other words, when the plurality of loop coils are arranged along a specific direction on a specific plane such that the respective coil planes do not overlap each other, each of the static field magnets 10A and 10B accommodating the plurality of loop coils can be formed into a rectangular parallelepiped shape in which: the direction orthogonal to the specific plane is the thickness direction; the specific direction is the longitudinal direction; and the direction orthogonal to both the thickness direction and the longitudinal direction is the lateral direction.

As a result, when the object is imaged in a recumbent posture such that the head-foot direction of the object matches the longitudinal direction of the static field magnet 10, the object can be easily accessed from the lateral direction of the static field magnet 10, which facilitates a medical procedure such as PCI during imaging.

When imaging is performed in such a manner that the lateral direction of the rectangular parallelepiped static field magnets 10A and 10B roughly matches the left-right direction (or anterior-posterior direction) of the object, the feeling of oppression and occlusion to the object is significantly reduced as compared with the conventional static field magnet 200.

FIG. 4A and FIG. 4B illustrate the configuration of the static field magnet 10 according to the present embodiment in more detail. FIG. 4A is a plan view illustrating the internal configuration of the upper static field magnet 10A, and FIG. 4B is a side view illustrating the respective internal configurations of the upper and lower static field magnets 10A and 10B.

Each of the upper and lower static field magnets 10A and 10B includes the loop coil pair composed of the first loop coil 101 and the second loop coil 102.

As shown in FIG. 4A, a first coil plane 401 is a planar area surrounded by a first loop that forms the first loop coil 101, a second coil plane 402 is a planar area surrounded by a second loop that forms the second loop coil 102, and the first coil plane 401 and the second coil plane 402 are arranged side by side along a specific direction (i.e., a primary direction) of a specific plane (i.e., a primary plane) 500 so as not to overlap each other.

The first loop coil 101 and the second loop coil 102 have the same shape having a major axis and a minor axis. In the embodiment shown in FIG. 4A and FIG. 4B, the first and second loop coils 101 and 102 are in a rectangular shape and respectively have a major axis 301 and a major axis 302. The major axes 301 and 302 correspond to the axes of line symmetry in the longitudinal direction of the first and second loop coils 101 and 102, and the first and second loop coils 101 and 102 are arranged such that the two major axes 301 and 302 are parallel to each other.

Note that the minor (short side) axes (not shown) are axes on the coil planes 401 and 402 orthogonal to the respective major (long side) axes 301 and 302 of the first and second loop coils 101 and 102. The first and second loop coils 101 and 102 have long side (major axis) and short side (minor axis) with dimensions different from the long side. In other words, the first and second loop coils 101 and 102 have the same shape which is elongate with a long side and a short side. Here, the aspect ratio, the ratio of the length of the short side to the length of the long side, is less than one such that the long side dimension is longer than the short side dimension.

The above-described specific plane 500 is a plane that contains the respective major axes 301 and 302 of the first and second loop coils 101 and 102 constituting the loop coil pair. The above-described specific direction is a direction orthogonal to each of the two major axes 301 and 302 in the above-described specific plane 500. The first and second loop coils 101 and 102 are arranged line-symmetrically with respect to the central axis 300 of the loop coil pair composed of the first and second loop coils 101 and 102. The length Dz of the loop coil pair 101, 102 in the longitudinal direction corresponds to the maximum width of the outer periphery of the loop coil pair 101, 102 in the Z-axis direction, and the length Dx of the loop coil pair 101, 102 in the lateral direction corresponds to the maximum width of the outer periphery of the loop coil pair in the X-axis direction.

In FIG. 4A and FIG. 4B, among the X-axis, Y-axis, and Z-axis that are orthogonal to each other, the Z-axis direction is the above-described specific direction, the X-axis direction is the direction parallel to the major axes 301 and 302, and the Y-axis direction is the direction orthogonal to the specific plane 500. This relationship is the same in FIG. 5A to FIG. 10B described below.

As shown in FIG. 4B, the loop coil pair 101, 102 of the upper static field magnet 10A (i.e., first loop coil pair) is disposed on a first specific plane 500 (i.e., the specific plane 500 included in the upper static field magnet 10A in FIG. 4B), and the loop coil pair 101, 102 of the lower static field magnet 10B (i.e., second loop coil pair) is disposed on a second specific plane 500 (i.e., the specific plane 500 included in the lower static field magnet 10B in FIG. 4B).

As shown in FIG. 4A, in the upper static field magnet 10A, the first loop coil 101 is supplied with a first electric current i1 in a first direction (for example, clockwise direction on the sheet of FIG. 4A) while the second loop coil 102 is supplied with a second electric current i2 in a second direction (for example, counterclockwise direction on the sheet of FIG. 4A), which is opposite to the first direction. The lower static field magnet 10B is supplied with electric currents in the directions opposite to that of the respective first and second loop coils 101 and 102 of the upper static field magnet 10A. In other words, in the lower static field magnet 10B, the first loop coil 101 is supplied with the second electric current i2 in the second direction while the second loop coil 102 is supplied with the first electric current i1 in the first direction.

Since the electric currents flow through the first and second loop coils 101 and 102 of the upper and lower static field magnets 10A and 10B in the above-described direction, in the imaging region between the upper and lower static field magnets 10A and 10B, a static magnetic field Bo parallel to the above-described specific direction (i.e., Z-axis direction in FIG. 4A and FIG. 4B) can be generated (FIG. 3).

Since the electric currents flow through the first and second loop coils 101 and 102 of the upper and lower static field magnets 10A and 10B in the above-described direction, in the imaging region between the upper and lower static field magnets 10A and 10B, the static magnetic field can be generated with magnetic field strength distribution that is uniformized in the three orthogonal directions including: the specific direction (i.e., Z-axis direction in FIG. 4A and FIG. 4B); the direction orthogonal to the specific plane 500 (i.e., Y-axis direction in FIG. 4A and FIG. 4B); and the direction parallel to the specific plane 500 and orthogonal to the specific direction (i.e., X-axis direction in FIG. 4A and FIG. 4B).

(Modifications of Static Field Magnet)

Hereinafter, a description will be given of several modifications of the static field magnet 10 by using FIG. 5A to FIG. 13.

Figure 5A:
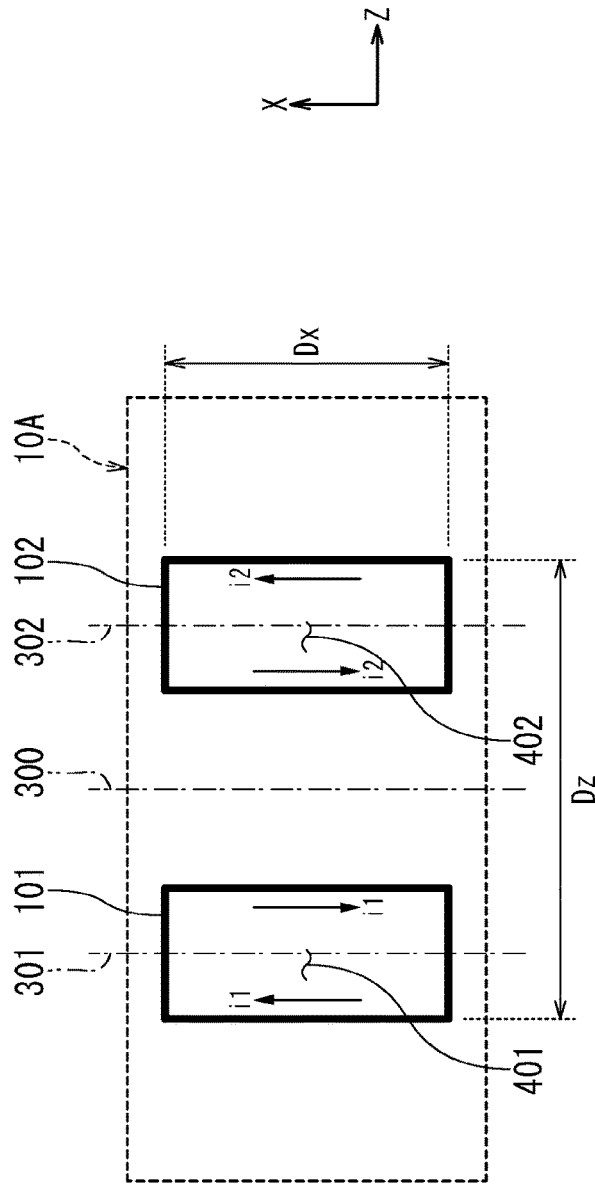
FIG. 5A and FIG. 5B are schematic diagrams illustrating a configuration of the static field magnet 10 according to the first modification.
Figure 5B:
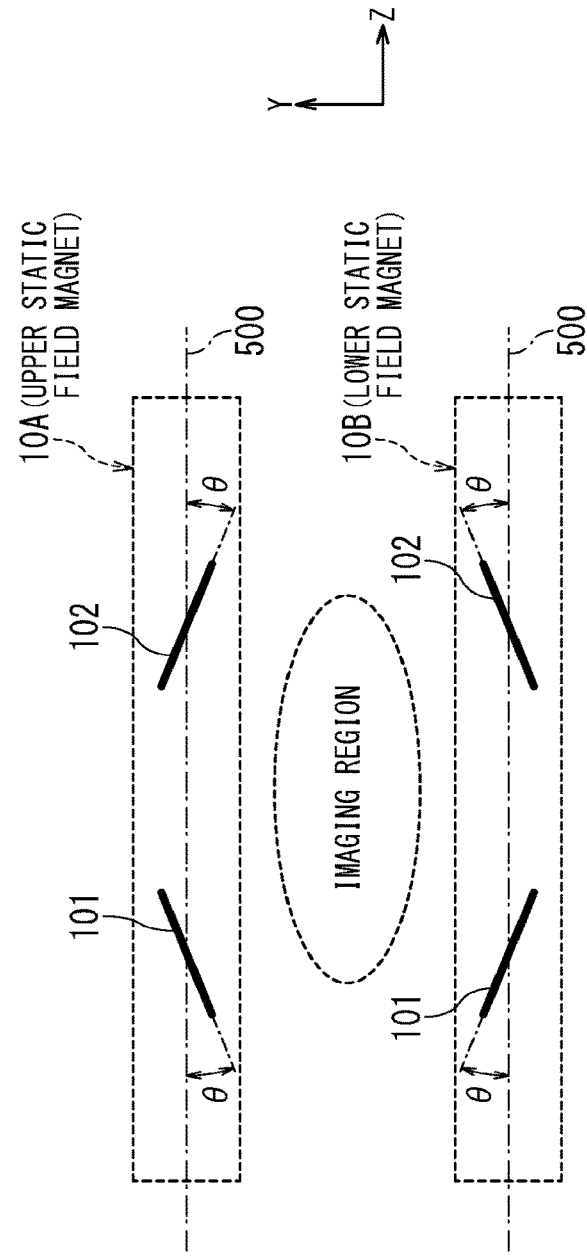

FIG. 5A and FIG. 5B are schematic diagrams illustrating a configuration of the static field magnet 10 according to the first modification. In the static field magnet 10 of the above-described embodiment shown in FIG. 4A and FIG. 4B, in both the upper and lower static field magnets 10A and 10B, the first and second loop coils 101 and 102 are arranged such that the first coil plane 401 and the second coil plane 402 are included in the specific plane 500.

In the first modification, the first and second loop coils 101 and 102 are arranged such that the first coil plane 401 and the second coil plane 402 are tilted with respect to the specific plane 500 at a predetermined tilt angle θ around the respective major axes 301 and 302. The tilt angle θ of the first coil plane 401 with respect to the specific plane 500 and the tilt angle θ of the second coil plane 402 with respect to the specific plane 500 have the same absolute value and opposite in direction to each other. In other words, the first and second loop coils 101 and 102 are mirror-symmetrical with respect to a plane that includes the central axis 300 and is orthogonal to the specific plane 500. Since the first and second coil planes 401 and 402 are tilted with respect to the specific plane 500 in this manner, degree of freedom of the static magnetic field distribution to be formed can be enhanced and a wider uniform static-magnetic-field region can be obtained.

Figure 6A:
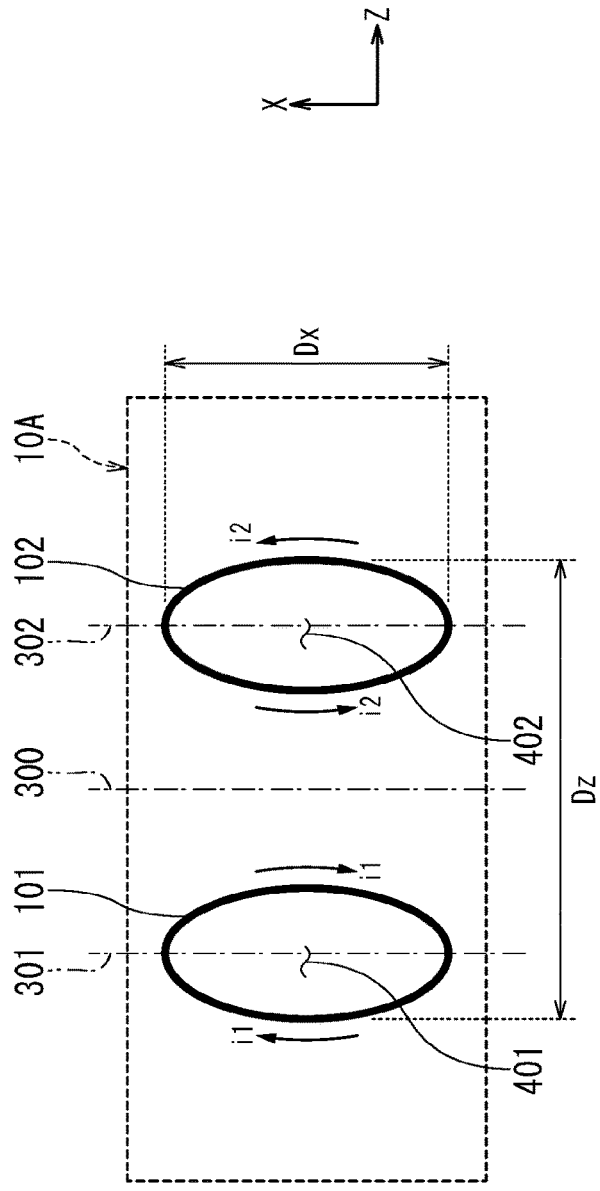
FIG. 6A and FIG. 6B are schematic diagrams illustrating a configuration of the static field magnet 10 according to the second modification.
Figure 6B:
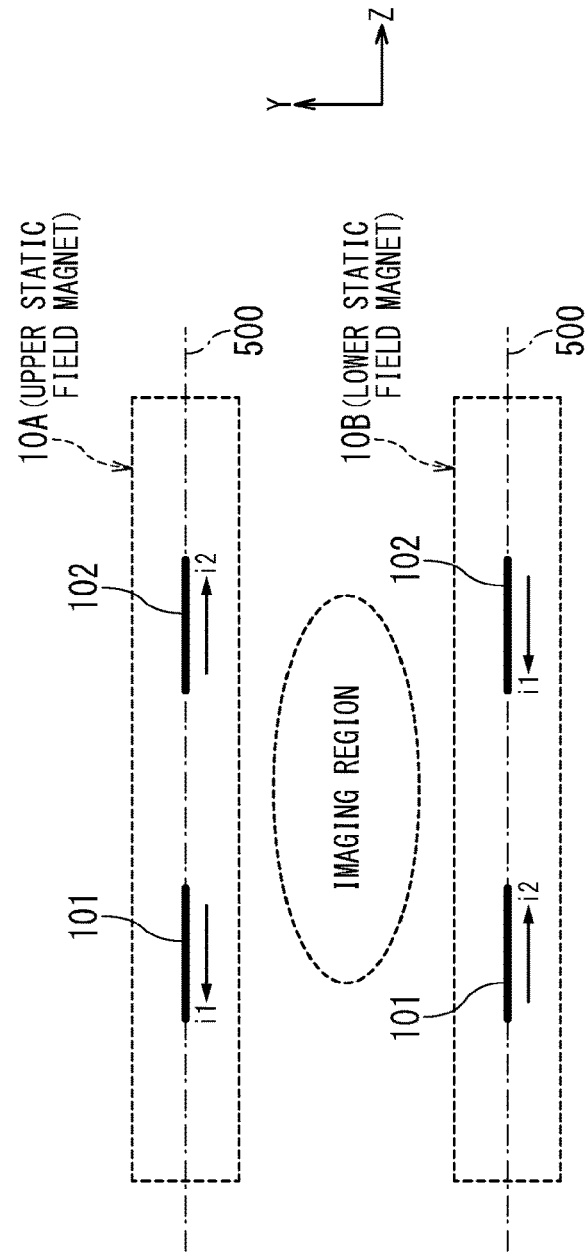

FIG. 6A and FIG. 6B are schematic diagrams illustrating a configuration of the static field magnet 10 according to the second modification. In the static field magnet 10 of the above-described embodiment shown in FIG. 4A and FIG. 4B, the respective shapes of the first and second loop coils 101 and 102 are rectangular. However, the shapes of the first and second loop coils 101 and 102 are not limited to such an aspect and may be an ellipse having the respective major axes 301 and 302 as shown in FIG. 6A and FIG. 6B.

FIG. 7A and FIG. 7B are schematic diagrams illustrating a configuration of the static field magnet 10 according to the third modification. Although the static field magnet 10 of the above-described embodiment has one loop coil pair composed of the first and second loop coils 101 and 102 as shown in FIG. 4A and FIG. 4B, the number of loop coil pairs may be two or more.

In the third modification shown in FIG. 7A and FIG. 7B, each of the upper and lower static field magnets 10A and 10B includes: a first/second loop coil pair composed of the first loop coil 101 and the second loop coil 102; and a third/fourth loop coil pair composed of a third loop coil 103 and a fourth loop coil 104.

The first/second loop coil pair 101, 102 and the third/fourth loop coil pair 103, 104 are arranged in such a manner that the axis of line symmetry in the specific direction (i.e., Z-axis direction) of each other coincide with each other at the central axis 300.

When the specific direction is defined as the longitudinal direction, the length in a longitudinal direction of the first/second loop coil pair 101, 102 and the length in a longitudinal direction of the third/fourth loop coil pair 103, 104 are different from each other.

As to dimension between: the first/second specific plane (i.e., a first primary plane) 500 on which the first/second loop coil pair 101, 102 is disposed; and the third/fourth specific plane (i.e., a second primary plane) 501 on which the third/fourth loop coil pair 103, 104 is disposed, as long as specific planes 500 and 501 are parallel to each other as shown in FIG. 7B, the specific planes 500 and 501 do not necessarily have to match each other.

Since a plurality of loop coil pairs are provided, as compared with the case where only one loop coil pair is provided, the degree of freedom of static magnetic field distribution to be formed can be enhanced and a wider uniform static-magnetic-field region can be obtained.

Figure 8A:
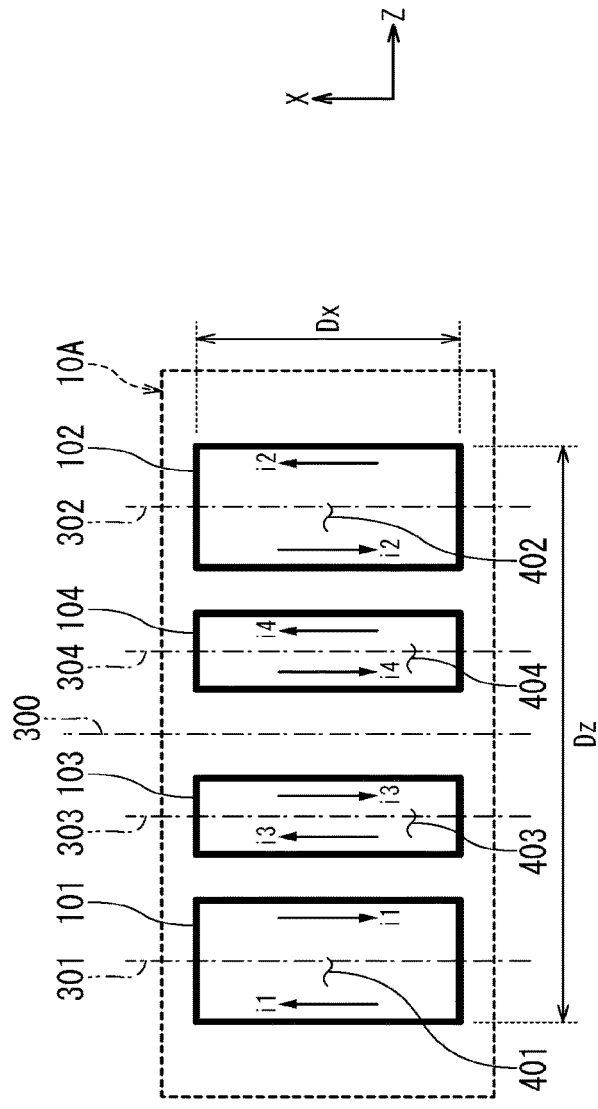
FIG. 8A and FIG. 8B are schematic diagrams illustrating a configuration of the static field magnet 10 according to the fourth modification.
Figure 8B:
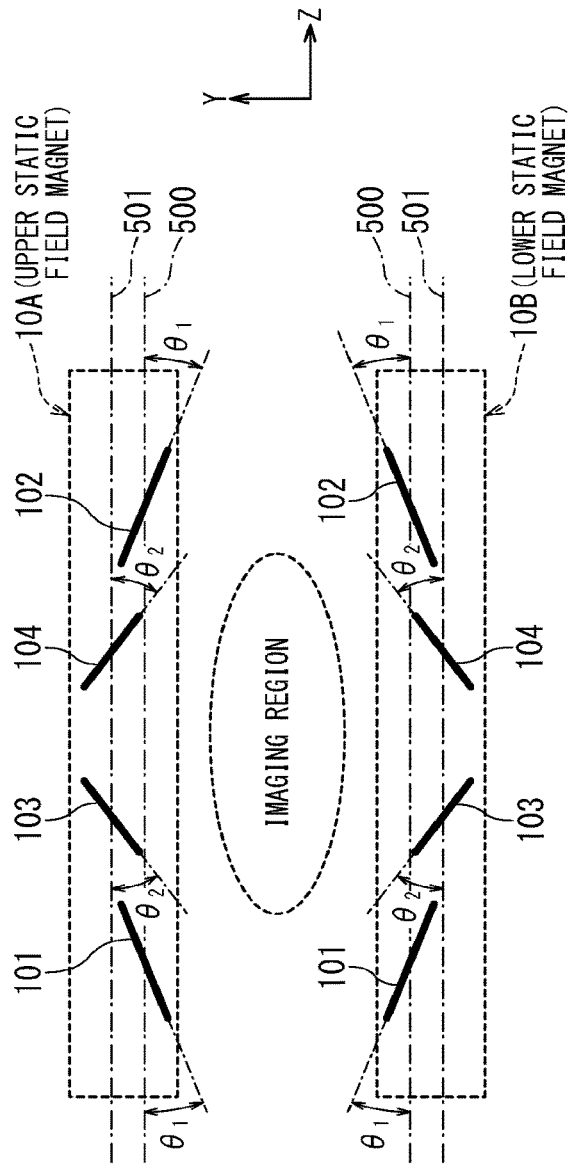

FIG. 8A and FIG. 8B are schematic diagrams illustrating a configuration of the static field magnet 10 according to the fourth modification. In the above-described static field magnet 10 according to the third modification shown in FIG. 7A and FIG. 7B, the first and second loop coils 101 and 102 are arranged such that the first and second coil planes 401 and 402 are parallel to the first/second specific plane 500 and included in the first/second specific plane 500. Similarly, the third and fourth loop coils 103 and 104 are arranged such that the third coil plane 403 and the fourth coil plane 404 are parallel to the third/fourth specific plane 501 and included in the third/fourth specific plane 501.

In contrast, in the fourth modification, the first and second loop coils 101 and 102 are arranged such that the first and second coil planes 401 and 402 are tilted with respect to the first/second specific plane 500 at a predetermined tilt angle $\theta_1$ around the respective major axes 301 and 302. Similarly, the third and fourth loop coils 103 and 104 are arranged such that the third and fourth coil planes 403 and 404 are tilted with respect to the third/fourth specific plane 501 at a predetermined tilt angle $\theta_2$ around the respective major axes 303 and 304. The tilt angle $\theta_1$ and the tilt angle $\theta_2$ may be the same or different.

In the fourth modification, each of the coil planes 401, 402, 403, and 404 has the tilt angle $\theta_1$ or $\theta_2$ with respect to the specific plane 500 or 501, which enhances the degree of freedom of static magnetic field distribution to be formed and enables formation of a wider uniform static-magnetic-field region as compared with the third modification.

FIG. 9A and FIG. 9B are schematic diagrams illustrating a configuration of the static field magnet 10 according to the fifth modification. In the above-described static field magnets 10 according to the third and fourth modifications, each of the first to fourth loop coils 101, 102, 103, 104 has a rectangular shape as shown in FIG. 7A and FIG. 8A, but the first to fourth loop coils 101, 102, 103, 104 are not limited to such a shape. As shown in FIG. 9A, the shape of the first to fourth loop coils 101, 102, 103, and 104 may be elliptical with the major axes 301, 302, 303, and 304, respectively.

Figure 10A:
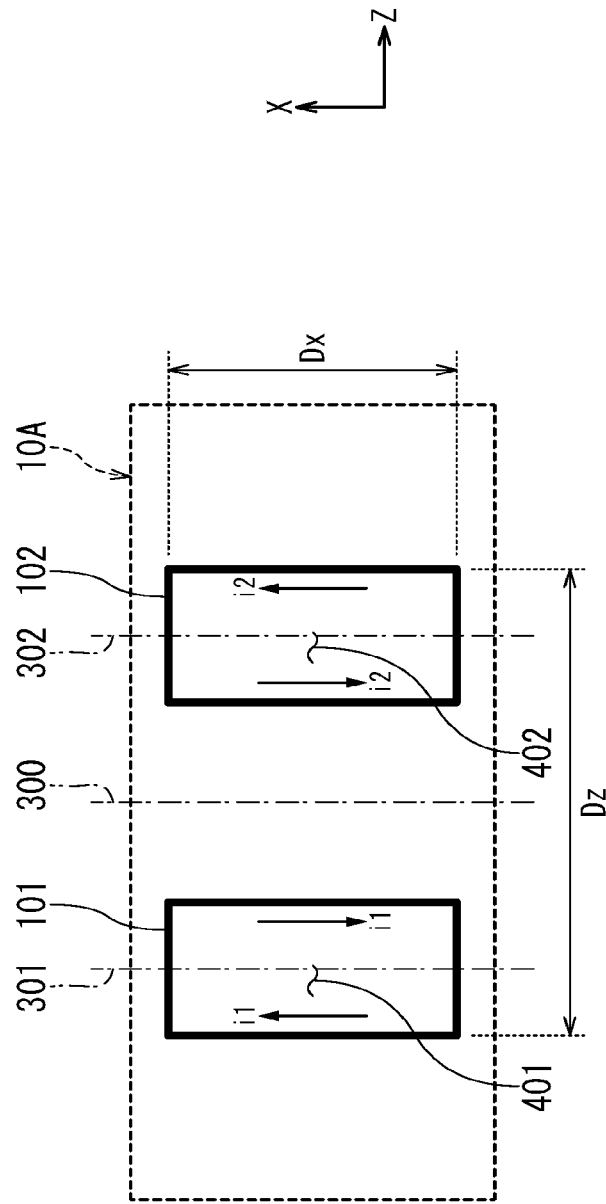
FIG. 10A and FIG. 10B are schematic diagrams illustrating a configuration of the static field magnet 10 according to the sixth modification.
Figure 10B:
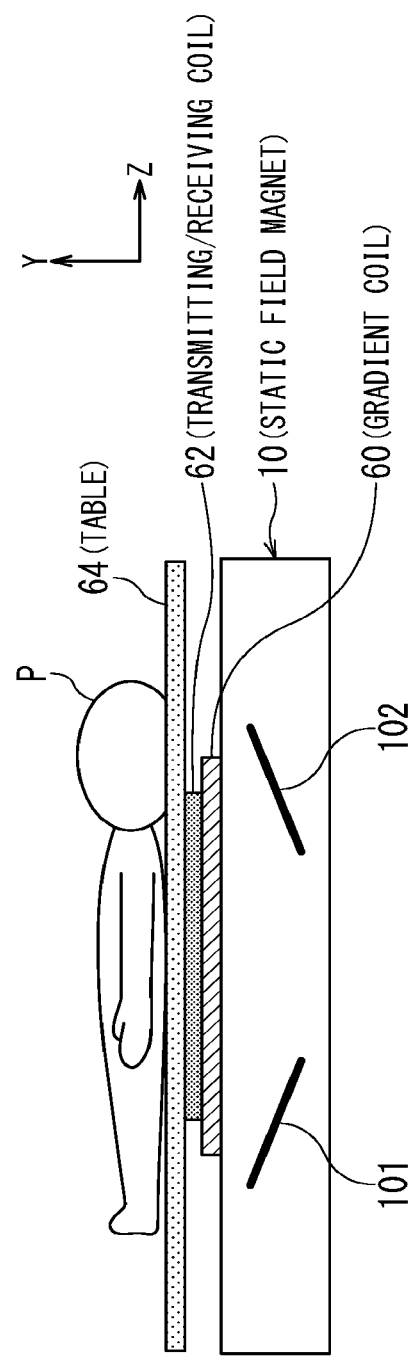

FIG. 10A and FIG. 10B are schematic diagrams illustrating a configuration of the static field magnet 10 according to the sixth modification. The static field magnet of any one of the above-described embodiment and the first to fifth modifications includes the upper and lower static field magnets 10A and 10B and is provided with the imaging region in the space between the upper and lower static field magnets 10A and 10B.

By contrast, the static field magnet 10 according to the sixth modification includes only one of the upper and lower static field magnets 10A and 10B, for example, includes only the lower static field magnet 10B as shown in FIG. 10A and FIG. 10B. Note that the lower static field magnet 10B of any one of the above-described embodiment and the first to fifth modifications may be used as the static field magnet 10B of the sixth modification. In the configuration of FIG. 10A and FIG. 10B, the lower static field magnet 10B of the first modification (FIG. 5A and FIG. 5B) is used as the static field magnet 10 of the sixth modification.

With the static field magnet 10 according to the sixth modification, the static magnetic field generated in the region above the static field magnet 10 is used for imaging the object P. In other words, the imaging region is set spatially above the static field magnet 10. FIG. 10B also illustrates: the table 64 on which the object P lies; a gradient coil 60; and a transmitting/receiving coil 62. The gradient coil 60 and the transmitting/receiving coil 62 are provided between the table 64 and the static field magnet 10.

Distribution of the static magnetic field generated by the sixth modification is uniformized in both the specific direction (which is the direction orthogonal to each of the two major axes 301 and 302, that is, the Z-axis direction in FIG. 10B); and the direction (i.e., X-axis direction in FIG. 10A) that is parallel to the specific plane (i.e., the plane including the two major axes 301 and 302) and orthogonal to the specific direction, and varies monotonously in the direction orthogonal to the specific plane (i.e., in the Y-axis direction in FIG. 10B).

Figure 11:
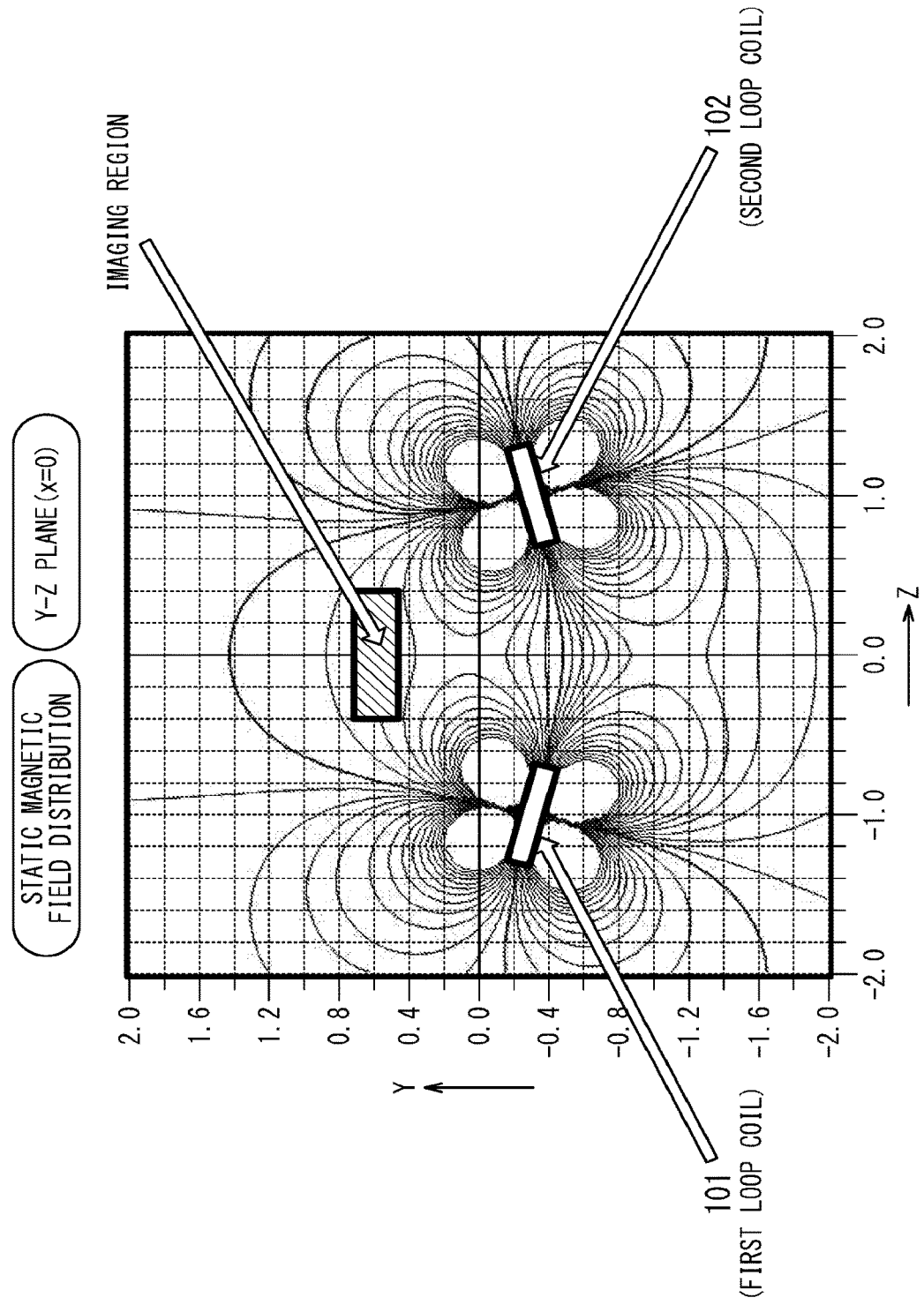
FIG. 11 is a schematic diagram illustrating static magnetic field distribution in a Y-Z plane of the static field magnet.
Figure 12:
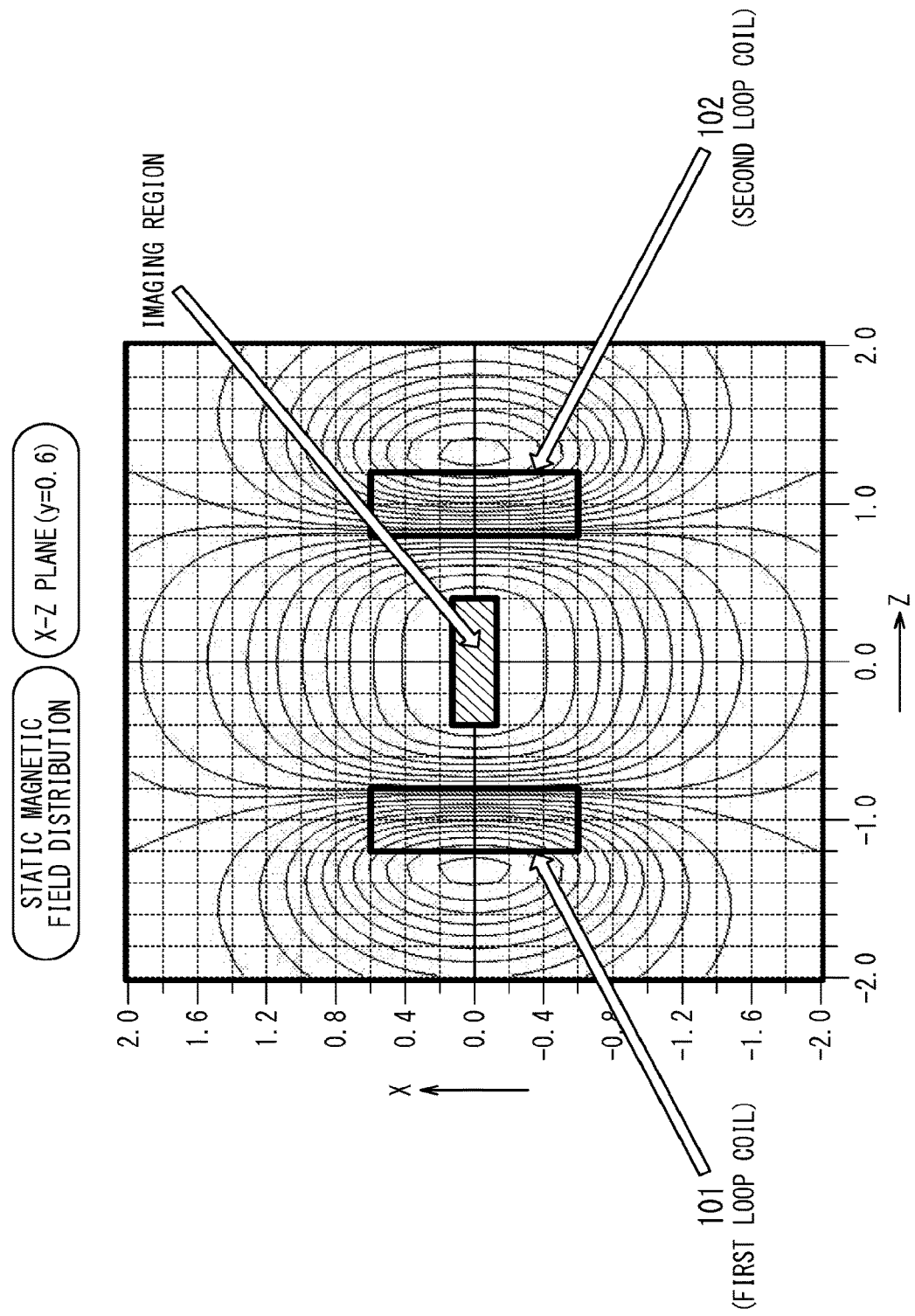
FIG. 12 is a schematic diagram illustrating static magnetic field distribution in an X-Z plane of the static field magnet.
Figure 13:
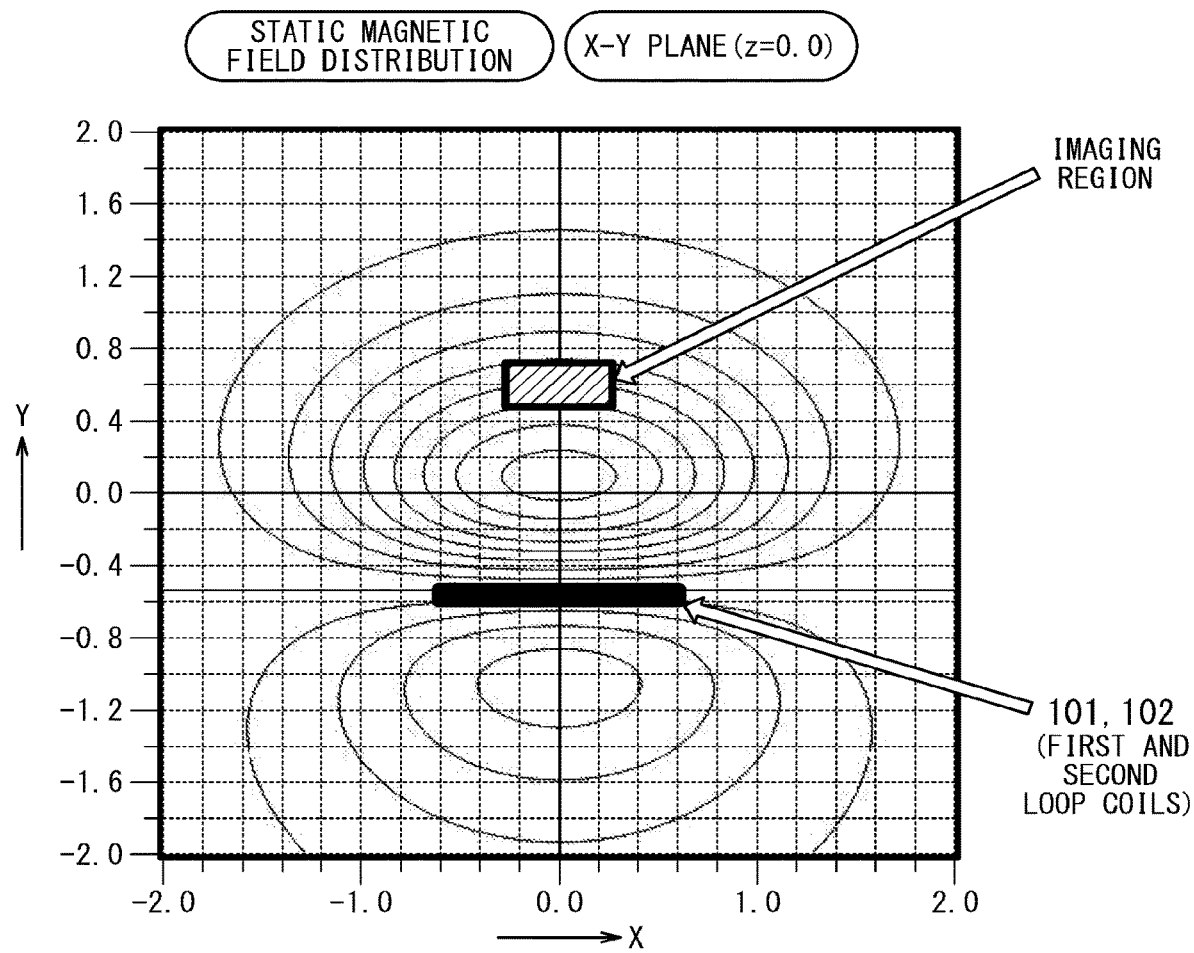
FIG. 13 is a schematic diagram illustrating static magnetic field distribution in an X-Y plane of the static field magnet.

FIG. 11 to FIG. 13 are schematic diagrams illustrating calculated distribution of the static magnetic field generated by the static field magnet 10 according to the sixth modification. FIG. 11 shows the static magnetic field distribution in the Y-Z plane when the value of the X-axis is zero, i.e., in the Y-Z plane at the central position of the static field magnet 10 in the lateral direction. The curves in FIG. 11 represent the static magnetic field strength as contour lines. In FIG. 11, the horizontal axis indicates the position in the normalized Z-axis direction, and the vertical axis indicates the position in the normalized Y-axis direction.

In the calculation example shown in FIG. 11, the center position (z, y) of the first loop coil 101 is (−1.0, −0.3), and the center position (z, y) of the second loop coil 102 is (+1.0, −0.3). In this calculation example, the magnetic field strength in the Z-axis direction is uniformized in the predetermined range that is centered at y=0.6 and between −0.2 and +0.2 in the Z-axis position, and this region is selected as the imaging region. Meanwhile, in the imaging region (an area surrounded by thick line in FIG. 11), the static magnetic field is formed such that the magnetic field strength varies monotonously in the Y-axis direction (i.e., the direction orthogonal to the table 64).

FIG. 12 shows the static magnetic field distribution in the X-Z plane at y=0.6. In the X-Z plane, the imaging region is a predetermined range that is centered at x=0.0 and between −0.2 and +0.2 in the Z-axis position. In the X-Z plane of the imaging region, the magnetic field strength is uniformized in both the X-axis direction and the Z-axis direction.

FIG. 13 shows the static magnetic field distribution in the X-Y plane at z=0.0. In the X-Y plane, the imaging region is a predetermined range that is centered at x=0.0 and y=0.6. In the X-Y plane of the imaging region, static magnetic field distribution is formed such that the magnetic field strength is uniformized in the X-axis direction, while varying monotonically in the Y-axis direction.

(MRI Apparatus)

Figure 14:
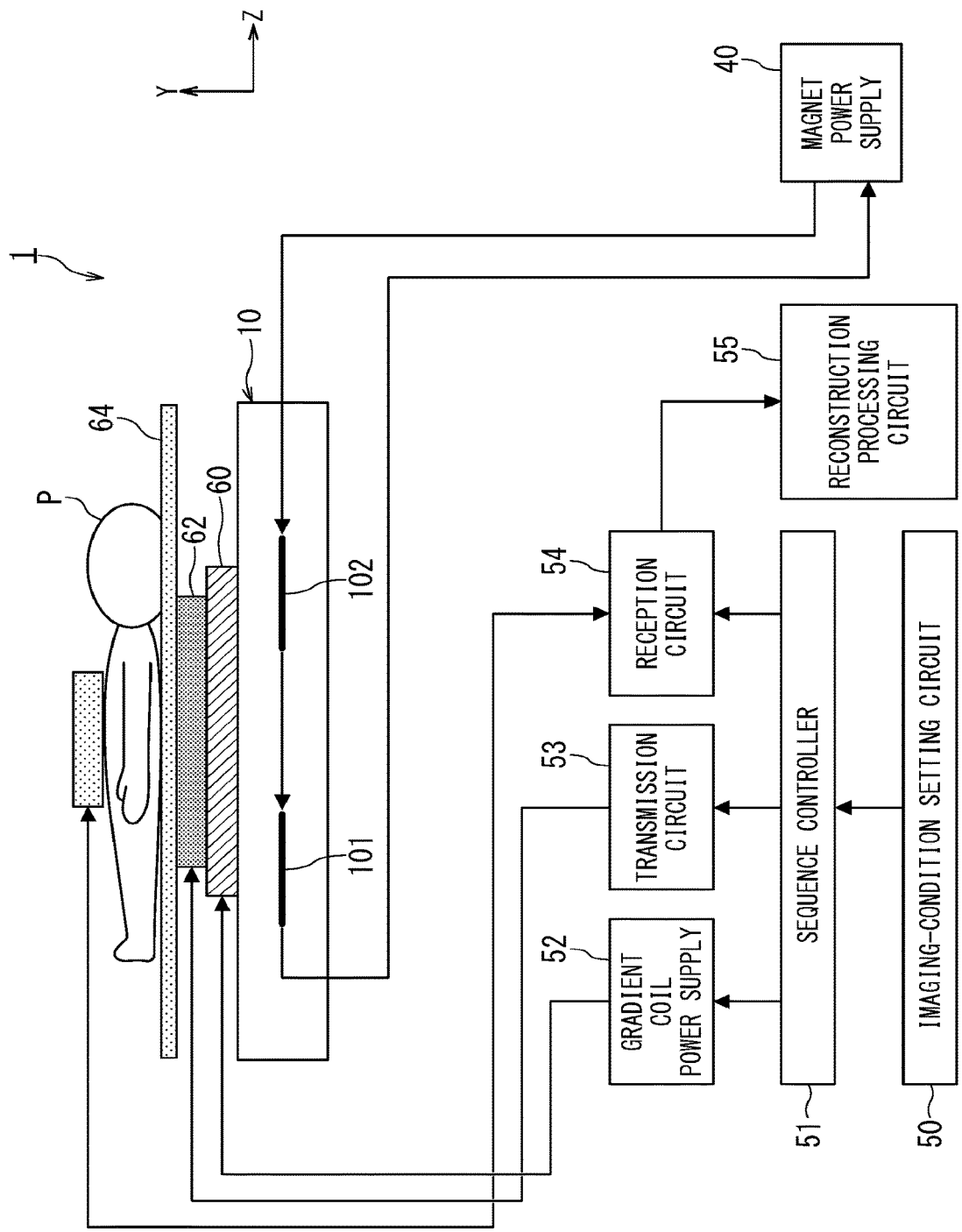
FIG. 14 is a schematic diagram illustrating a configuration of the MRI apparatus that includes the static field magnet according to one of the present embodiment and its modifications.

FIG. 14 is a schematic diagram illustrating a configuration of the MRI apparatus 1 that includes the static field magnet 10 of one of the above-described embodiment and its modifications. From among the static field magnets 10 according to the above-described embodiment and its respective modifications, the static field magnet 10 of the sixth modification having only the lower static field magnet 10B is adopted in the MRI apparatus 1 shown in FIG. 14.

The MRI apparatus 1 includes: the static field magnet 10; the gradient coil 60; the transmitting/receiving coil 62; the table 64; a magnet power supply 40; an imaging-condition setting circuit 50; a sequence controller 51; a gradient-coil power supply 52; a transmission circuit 53; a reception circuit 54; and a reconstruction processing circuit 55.

The magnet power supply 40 is a power supply that applies electric currents to the respective first and second loop coils 101 and 102 of the static field magnet 10. When the static field magnet 10 is configured as a normal conducting magnet (resistive magnet), the magnet power supply is always connected to the static field magnet 10. When the static field magnet 10 is configured as a superconducting magnet, the magnet power supply 40 supplies electric currents to the static field magnet 10 in an excitation mode, and then is disconnected from the static field magnet 10 after the static field magnet 10 shifts to the permanent current mode.

The imaging-condition setting circuit 50 sets or selects imaging conditions, such as a type of pulse sequence and values of various parameters inputted via a user interface (not shown), on the sequence controller 51. The sequence controller 51 performs a scan of the object by driving the gradient-coil power supply 52 and the transmitting circuit 53 based on the selected imaging conditions.

The gradient-coil power supply 52 applies a gradient magnetic field current to the gradient coil 60 based on a drive signal from the sequence controller 51. The transmission circuit 53 generates an RF pulse based on the drive signal from the sequence controller 51, and applies the RF pulse to the transmitting/receiving coil 62. Each MR signal emitted from the object P in response to application of the RF pulse is received by, for example, a local RF coil attached to the chest of the object P. The MR signals received by the local RF coil are converted from analog signals into digital signals by the reception circuit 54. The MR signals converted into digital signals are inputted as k-space data to the reconstruction processing circuit 55. The reconstruction processing circuit 55 performs reconstruction processing such as inverse Fourier transform on the k-space data to generate a magnetic resonance image.

According to at least one embodiment described above, in imaging using an open-type static field magnet, both easy access to an object during imaging and a widely secured imaging region in the head-foot direction of the object can be available.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the scope of the invention as defined by the appended claims.

What is claimed is:

1. A static field magnet configured to be used in an MRI apparatus configured to image an object,
   the static field magnet comprising at least one loop coil pair that includes a first loop coil configured to be supplied with a first electric current in a first direction, and a second loop coil configured to be supplied with a second electric current in a second direction opposite to the first direction, wherein,
   the first and second loop coils are arranged in such a manner that a first coil plane and a second coil plane are along a primary direction without overlapping each other,
      the primary direction being included in a single primary plane,
      the first coil plane being a planar area surrounded by a first loop that forms the first loop coil, and
      the second coil plane being a planar area surrounded by a second loop that forms the second loop coil,
   the at least one loop coil pair is arranged in the single primary plane that is provided either at an upper position above the object or at a lower position below the object, and is configured to generate a static magnetic field parallel to the primary direction, and
   the static field magnet comprises only the first coil plane and the second coil plane included in the single primary plane,
   wherein the first loop and the second loop are of a same shape having a major axis and a minor axis, and
   wherein the first and second loop coils are arranged to be orthogonal to the primary direction in such a manner that the major axis of the first loop and the major axis of the second loop are included in the single primary plane and parallel to each other.

2. The static field magnet according to claim 1, wherein the first loop and the second loop have the same loop shape which is elongate.

3. The static field magnet according to claim 1, wherein each of the first loop and the second loop is in a rectangular shape.

4. The static field magnet according to claim 1, wherein each of the first loop and the second loop is in an elliptical shape.

5. The static field magnet according to claim 1, wherein the first and second loop coils are arranged in such a manner that the first coil plane and the second coil plane are tilted with respect to the single primary plane at a predetermined tilt angle.

6. The static field magnet according to claim 5, wherein the tilt angle of the first coil plane with respect to the single primary plane and the tilt angle of the second coil plane with respect to the single primary plane are opposite in direction to each other.

7. The static field magnet according to claim 1, wherein:
the at least one loop coil pair comprises a plurality of loop coil pairs; and
the plurality of loop coil pairs are arranged along the primary direction in such a manner that the plurality of loop coil pairs are different in length in a longitudinal direction and are same in a central position in the longitudinal direction, when the primary direction is defined as the longitudinal direction.

8. The static field magnet according to claim 1, wherein distribution of the static magnetic field in an imaging region of the object is uniformized in both the primary direction and a direction parallel to the single primary plane and orthogonal to the primary direction and varies monotonously in a direction orthogonal to the single primary plane.

9. An MRI apparatus comprising the static field magnet according to claim 1.

* * * * *